United States Patent [19]

Marumo et al.

[11] Patent Number: 4,888,984
[45] Date of Patent: Dec. 26, 1989

[54] LEVELLING DEVICE OF ROUGHNESS MEASURING MACHINE

[75] Inventors: Chihiro Marumo; Yoichi Toida; Masatsugu Nemoto; Junichi Iida; Kenji Sakuma, all of Kawasaki, Japan

[73] Assignee: Mitutoyo Corporation, Tokyo, Japan

[21] Appl. No.: 178,050

[22] Filed: Apr. 5, 1988

[30] Foreign Application Priority Data

Apr. 6, 1987 [JP] Japan .............................. 62-52472[U]

[51] Int. Cl.⁴ .............................................. G01B 5/28
[52] U.S. Cl. ...................................................... 73/105
[58] Field of Search .......................................... 73/105

[56] References Cited

U.S. PATENT DOCUMENTS 3,501,949  3/1970  Reason et al. ........................ 73/105
3,903,735  9/1975  Wilson ................................. 73/105
4,227,401 10/1980  McKechnie .......................... 73/105
4,665,739  5/1987  Mizuno ................................ 73/105

Primary Examiner—John Chapman
Assistant Examiner—Michele Simons
Attorney, Agent, or Firm—Flynn, Thiel, Boutell & Tanis

[57] ABSTRACT

The present invention is concerned with a levelling device of a roughness measuring machine and includes a device for searching a tilt angle of the center locus of a measured value of the roughness to a base line, a device for setting a tolerable tilt angle of the center locus, a comparator for determining whether the tilt angle is included in the tolerable tilt angle or not, and a device for changing the position of an object to be measured in accordance with the result of comparison by this comparator. When the tilt angle is determined to be not included in the tolerable tilt angle, a position change device is operated to change the position of the object, so that scale-out can be avoided.

5 Claims, 5 Drawing Sheets

LEVELLING DEVICE OF ROUGHNESS MEASURING MACHINE

BACKGROUND OF THE INVENTION

1. Field of the Invention

This invention relates to a levelling device of a roughness measuring machine, wherein a vertically movable stylus and an object to be measured are relatively moved to the left and right, with the both members being in contact with each other, and a vertical movement of the stylus is detected to measure a surface roughness of the object. The levelling device is of such an arrangement that changes in position between the object and displacement detecting means are performed such that a measured value does not scale out.

2. Description of Related Art

In general, the conventional roughness measuring machine has had the construction shown in FIG. 4.

As shown in a typified manner in FIG. 4, this roughness measuring machine has included: a base 1 having a flat and smooth top surface with an object W to be measured rested thereon; a column 2 erected on the base 1 in the direction of a Z-axis; a slider 3 being in engagement with a screw 4 provided at one end thereof with a handle 9 and vertically movable in the direction of Z-axis relative to the column 2; a movable member 6 movable by X-axis drive means, not shown, which is incorporated in the slider 3; a head 7 supported by the movable member 6; displacement detecting means 11 housed in the head 7; and a casing 8 including a measuring circuit, a control-operational circuit, display means and the like. The displacement detecting means 11 includes: a cross spring 14 secured to the head; an arm 13 rotatable about this cross spring; a stylus 12 provided on the forward end of the arm 13; and a displacement detector 15 formed of a differential transformer construction for example, which detects a vertical displacement of the stylus 12 by catching a tilt of the arm 13 when the stylus 12 vertically moves due to the surface roughness of the object W. Accordingly, when the object W is set onto the base 1, the handle 9 is operated to lower the slider 3 to thereby bring the stylus 12 into contact with the object W, and thereafter, the X-axis drive means is operated to move the stylus 12 and the object W relative to each other in the direction of X-axis (in this conventional example, the stylus 12 is moved), a displacement signal due to the vertical movement of the stylus 12 from the displacement detector 15 of the displacement detecting means 11 is inputted through a cable into the measuring circuit housed in the casing 8, where predetermined calculations and the like are performed, to thereby search the surface roughness of the object W as a measured value. The respective roughnesses corresponding to the positions of the object W in the direction of X-axis were able to be continuously enlargedly displayed on the display means formed of a CRT, and further, be stored in a blank.

However, the conventional roughness measuring machine has presented the following disadvantages.

More specifically, when the displacement detecting means 11 (head 7) and the surface of the object W are in parallel to each other in the lateral direction as shown in FIG. 5(A), on the display means (or on the storage blank), the measured values were able to be displayed with a scope between the upper limit value and the lower limit value, which has predetermined widths from a preset base line. However, for example, when the displacement detecting means 11 (head 7) is tilted due to the place of installation of the base 1 or the object W itself has a tilted surface (FIG. 5 shows a case where the object W has the tilted surfaces), such a disadvantageous situation was brought about that, even if the surface roughnesses of the object W appear as shown in FIG. 5(A), the measured value scales over the upper limit value or the lower limit value due to the fact that the center locus tilts to the base line as shown in FIGS. 5(B) or 5(C). This fact is caused by the construction wherein the displacement detecting means 11 detects a vertical displacement of the stylus 12 by the utilization of a tilt angle of the rotatable arm 13.

For this reason, in the past, while such preparations were made that the base 1 was set with the top surface thereof being positioned horizontally, whereby the displacement measuring means 11 (head 7) was able to move horizontally, measuring was tried to be conducted on the object W, which is rested on the base 1 over a predetermined length to be measured. When the measured value scaled over the upper limit value or the lower limit value, or there were such possibilities, the position of the object W was corrected, i.e. levelling work was performed. A roughness to be measured is in the order of micron meter, while, a measuring length is as long as several mm. Moreover, these data are to be enlarged to 50–1000 times for displaying in the display means. Accordingly, the levelling work is a so-called groping work, so that a fairly high skill level is required. Furthermore, even for a skilled worker, it is necessary to perform several times of levelling work, so that much labor and time are necessitated to spend, thus resulting in the disadvantages of that the operating efficiency and the production efficiency of the products are deteriorated and the economic burden is very high.

SUMMARY OF THE INVENTION

The present invention has been developed to obviate the above-described disadvantages of the related art and has as its object the provision of a levelling device of a roughness measuring machine, wherein quick and accurate levelling work can be automatically performed.

According to the present invention, the center locus of a measured value and a tilt angle of this center locus to the base line are searched by one provisional measuring, and position change means is operated such that the tilt angle is included in a tolerable tilt angle, so that the levelling work can be automatically performed.

To this end, the present invention contemplates to provide a levelling device of a roughness measuring machine, including:

tilt angle calculating mean for searching the center locus of a measured value in response to a displacement signal from displacement detecting means of the roughness measuring machine and for searching a tilt angle of this center locus to the base line;

a tolerable tilt angle setter for setting a tolerable tilt angle of the center locus of the measured value to the base line;

a comparator for comparing an output signal from the tilt angle calculating means with an output signal from the tolerable tilt angle setter to determine whether the tilt angle of the center locus of the measured value is larger than the tolerable tilt angle or not; and position change means for receiving an output from this comparator as an input to change the position of the object or the displacement detecting means such that a tilt angle of the measured value in the succeeding measuring becomes smaller than the tolerable angle; whereby automatic levelling work can be performed such that the measured value does not scale out of the upper and lower limit values.

According to the present invention with the above-described arrangement, when the object W and the stylus are moved in the direction of X-axis relative to each other, the center locus of the measured value and the tilt angle of the center locus to the base line can be searched by the tilt angle calculating means in response to a displacement signal from the displacement detecting means. And, in the comparator, both of the output signals from the tolerable tilt angle setter and the tilt angle calculating means are compared with each other to thereby determine whether the tilt angle of the center locus is larger than the tolerable tilt angle or not, i.e. the scale-over occurs or not. As a result, when it is determined that the scale-over may occur, the position change means is actuated to correct the positions of the object W and the displacement detecting means. Accordingly, complete levelling work can be carried out by one provisional measuring.

DETAILED DESCRIPTION OF THE PREFERRED EMBODIMENT

One embodiment of the levelling device of the roughness measuring machine according to the present invention will hereunder be described in detail with reference to the accompanying drawings.

Figure 1:
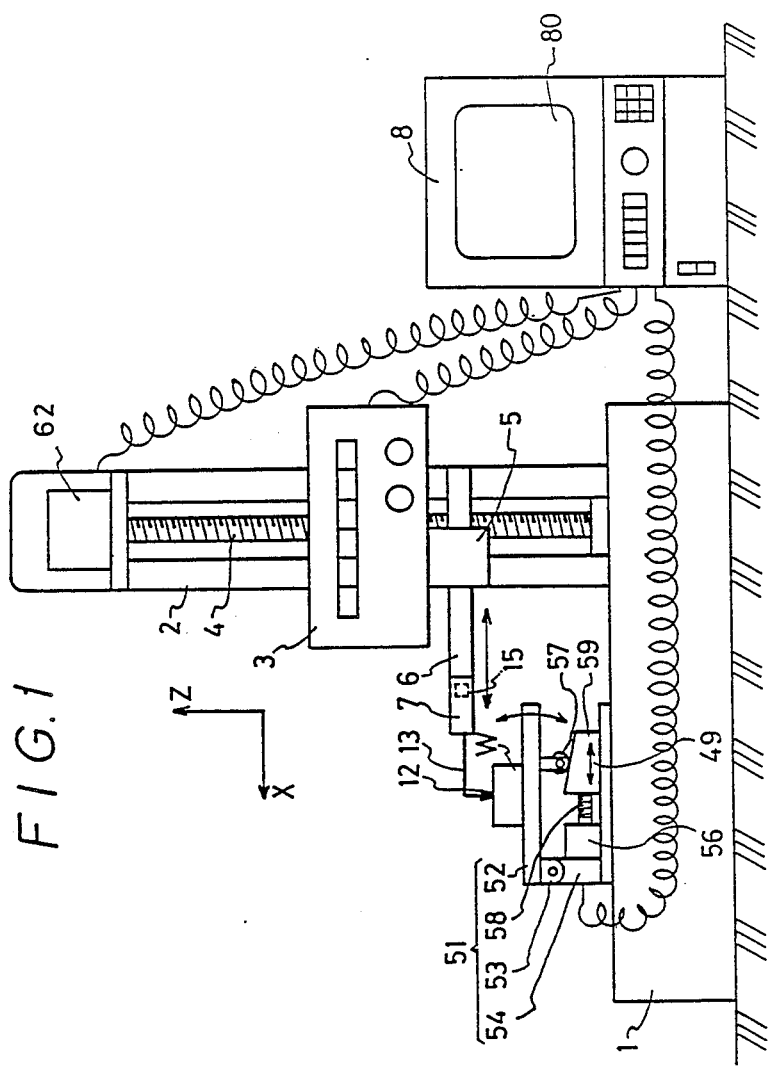
FIG. 1 is a general block diagram showing one embodiment of the levelling device of the roughness measuring machine according to the present invention.
Figure 3:
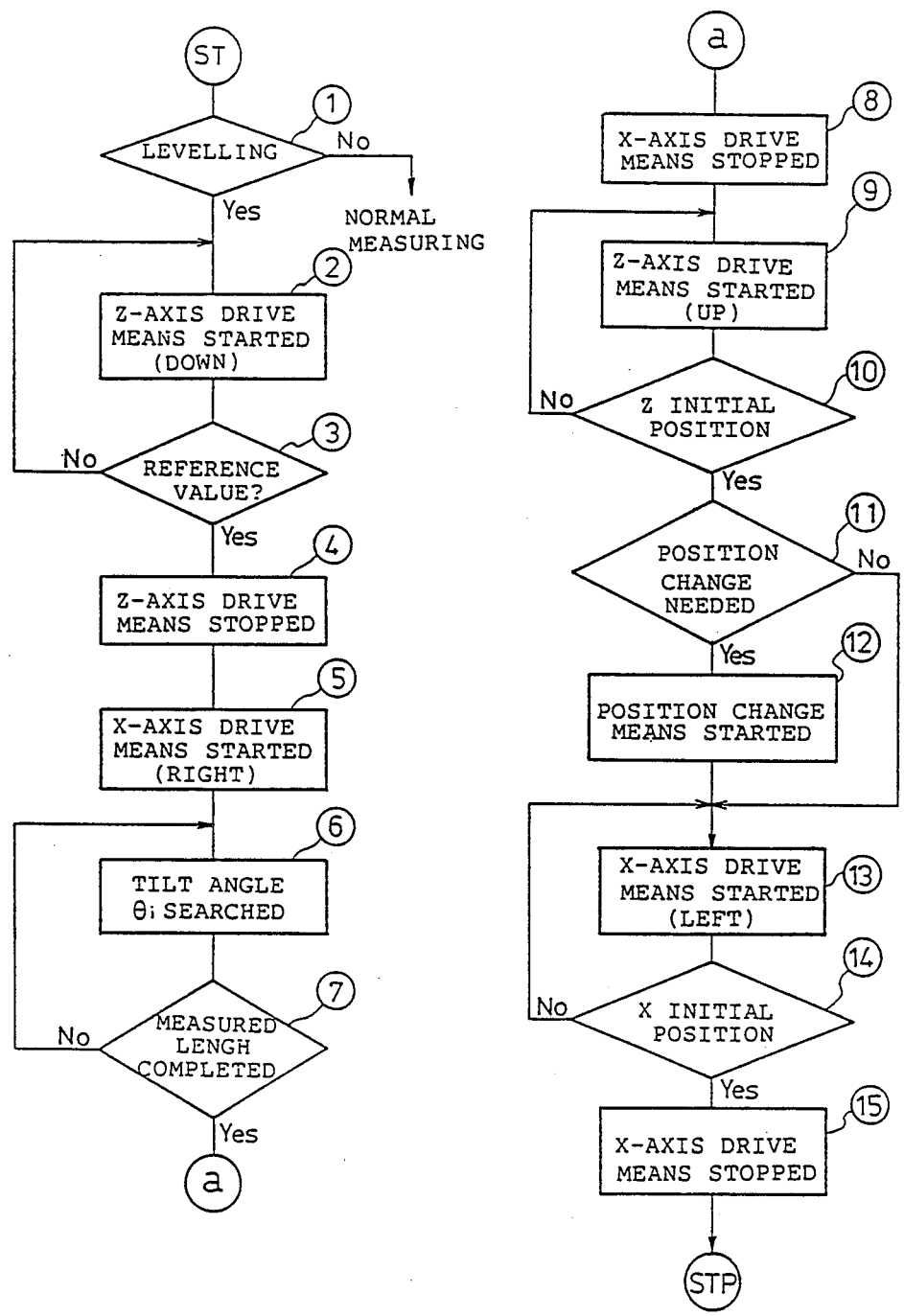
FIG. 3 a flow chart in explanation of the operations.
Figure 4:
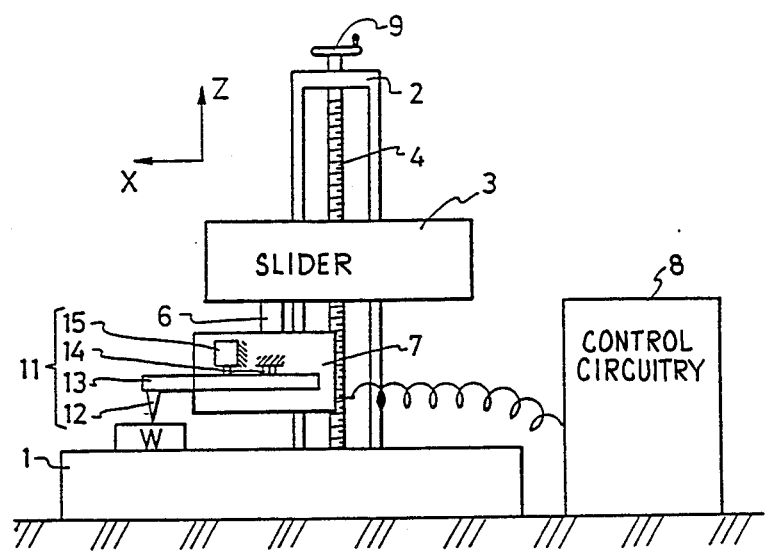
FIGS. 4 and 5(a)-(c) show the conventional roughness measuring machine, FIG. 4 showing the general block diagram and FIG. 5 showing the relationship between the position of the object and the tilt angle of the center locus of the measured value.

The roughness measuring machine in this embodiment has basically the same construction as the construction of the conventional roughness measuring machine. However, as shown in FIGS. 1 and 3, the slider 3 is automatically movable in the direction of Z-axis of the column 2 by Z-axis drive means 60 including a driving circuit 61 and a motor 62. Furthermore, the movable member 6 is mounted onto the slider 3 through a support member 5. The other respects of the mechanical arrangement are the same, whereby same reference numerals are used to designate same or similar parts, so that explanation is simplified or omitted.

Figure 2:
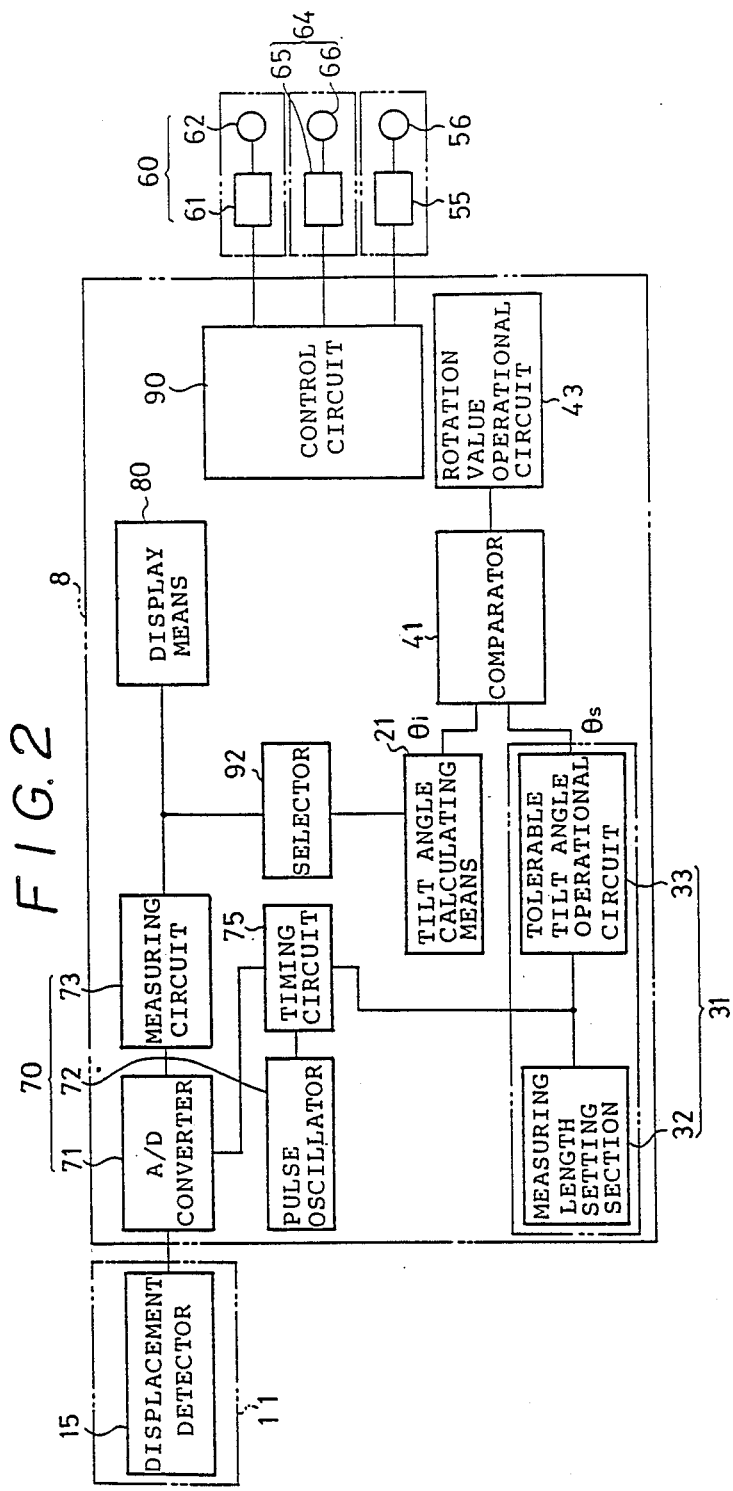
FIG. 2 is a general block diagram mainly showing an electric arrangement.

Now, referring to the electric arrangement and the levelling device, as shown in FIGS. 1 and 2, the displacement detecting means 11 including the displacement detector 15, measuring means 70 including an A/D converter 71, a pulse oscillator 72 and a measuring circuit 73, display means 80 formed of a CRT, and a control circuit 90 for drivably controlling the Z-axis drive means 60 and the like according to a predetermined procedure constitute the electric arrangement, which is basically the same as that of the conventional one. In this embodiment, a sampling time is variable with every measuring length based on a measuring length setter 32 which will hereunder be described, clock pulses from the pulse oscillator 72 are inputted into the A/D converter 71 via a timing circuit 75. Accordingly, such an arrangement is adopted that the stylus 12 and the object W are moved in the direction of X-axis relative to each other, an analogue signal corresponding to the vertical movement value of the stylus 12, which is outputted from the displacement detector 15, is converted into a digital signal by the A/D converter 71, predetermined calculations of the preset center-line mean roughness (Ra) and the maximum height (Rmax) are performed by the measuring circuit 73, and the measured value is outputted into the display means 80.

Next, the levelling device as being the featuring matter of the present invention includes the displacement detecting means 11, the tilt angle calculating means 21, the tolerable tilt angle setter 31, the comparator 41 and the position change means 51. Here, the tilt angle calculating means 21 searches the center locus of the measured value, which is inputted from the measuring circuit 73 via a selector 92 actuated when the levelling work is selected. More specifically, in this embodiment, the center locus of the measured value and the tilt angle thereof are searched by the method of least squares from a displacement value $Z_i$ of the vertical movement of the stylus 12 at the time of the first sampling and a position $X_i$ in the direction of X-axis, which is defined by a displacement value of a relative movement in the direction of X-axis between the object W and the stylus 12.

$$Z = A + BX \tag{1}$$

$$A = \frac{\sum_{i=1}^{n} Z_i}{n} - B \cdot \frac{\sum_{i=1}^{n} X_i}{n} \tag{2}$$

$$B = \frac{\sum_{i=1}^{n} X_i \cdot Z_i - \frac{\sum_{i=1}^{n} X_i}{n} \cdot \sum_{i=1}^{n} Z_i}{\sum_{i=1}^{n} (X_i^2) - \frac{\left(\sum_{i=1}^{n} X_i\right)^2}{n}} \tag{3}$$

Therefore, a tilt angle ($\theta_i$) of the center locus (mean line) can be searched in accordance with the expression (3). Here, n indicates the total number of samplings. Furthermore, the tilt angle calculating means 21 is adapted to store the tilt angle ($\theta_i$) of the center locus thus searched.

Figure 5A:
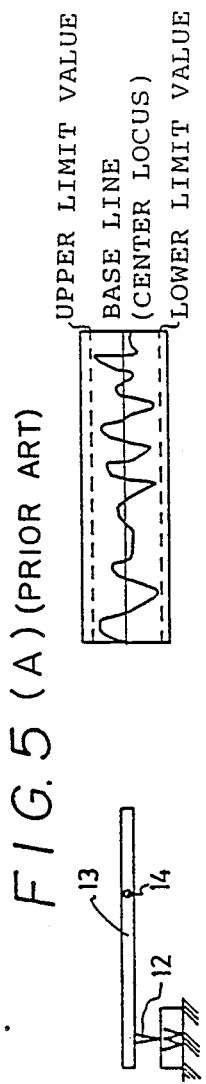

On the other hand, it is desirable that the tolerable tilt angle setter 31 indicates the measured value as centered about the base line (Refer to FIG. 5) between the upper and lower limit values, however, the tolerable tilt angle setter 31 determines the tolerable tilt angle ($\theta_s$) such that a tilt of some degree of the center locus searched from the measured value is tolerated to further facilitate the levelling work from the viewpoint of that no trouble is caused in practical use only if the measured value is indicated between, the upper and lower limit values as viewed from the display mode and the like of the display means 80. In this embodiment, each of the measuring length $L_1 = 0.25$ mm, $L_2 = 0.8$ mm which are provided for in JIS Regulations, is evenly divided by clock pulses from the pulse oscillator 72. The tolerable tilt angle setter 31 is constituted by a measuring length setting section 32 for setting the measuring lengths ($L_1$, $L_2$ and $L_3$) and a tolerable tilt angle operational circuit 33 for searching the tolerable tilt angles ($\theta_s$) corresponding to the measuring lengths thus set. Here, when the measuring length is large, the tolerable tilt angle ($\theta_s$) is set at a small value as compared with others. Furthermore, the comparator 41 compares the tilt angle $\theta_i$ from the tilt angle calculating means 21 with the tolerable tilt angle $\theta_s$ as being a reference, and determines whether $\theta_i$ is larger than $\theta_s$, the measured value exceeds the upper or lower limit value. Then, when it is determined that $\theta_i$ is larger than $\theta_s$ or not. This is because, when $\theta_i$ is larger than $\theta_s$, a drive command signal is outputted to the position change means 51, which will hereunder be described in detail, via a rotation value operational circuit 43 such that $\theta_i$ becomes smaller than $\theta_s$ in the measuring thenceforth.

Now, as mainly shown in FIG. 1, the position change means 51 includes: a pedestal 54 erected on the base 1; a mount 52 rotatably mounted on this pedestal 54 through a pivot 53; a cam member 59 threadably coupled to a screw 58 connected to a motor 56 and having a tilted surface 49; a roller 57 being in contact with the tilted surface 49 and rotatably mounted on the mount 52; and a driving circuit 55 (Refer to FIG. 2) connected to the control circuit 90. In other words, in this embodiment, the positional relationship between the object W, which is secured to the mount 52, and the displacement detecting means 11 can be adjusted by changing the object W in position. Accordingly, when the motor 56 is turned through a predetermined angle in response to a command value inputted into the driving circuit 55 through the comparator 41, the rotation value operational circuit 43 and the control circuit 90, the cam member 59 is displaced in the direction of X-axis by a predetermined value, with the result that the mount 52 is adjusted in tilt as turned about the pivot 53, so that the object W, which is mounted onto the mount 52, can be changed in position.

Action of this embodiment will hereunder be described.

It is assumed that the slider 3 is at its initial position in the direction of X-axis (at the top end of the column 2), the head 7 is at its initial position (in the state where the head is protruded to the utmost leftwardly relative to the slider 3 in FIG. 1), and a measuring length of a predetermined value is set by the measuring length setting section 32 of the tolerable tilt angle setter 31.

Here, when a levelling mode is selectively commanded by a selection switch, not shown, the selector 92 is turned ON and YES is determined in Block (1) shown in FIG. 3. Then, the Z-axis drive means 60 is driven by the control circuit 90, whereby the slider 3 is lowered along the column 2 (Block (2)). Then the stylus 12 comes into contact with the measuring surface of the object W, which is mounted onto the mount 52 of the position change means 51, further, the arm 13 of the displacement detecting means 11 (in a free state, it is adjusted that the side of the stylus 12 becomes heavier) rotates to the right in FIG. 1, and when an output signal from the displacement detector 15 reaches a preset value (reference value), the Z-axis drive means 60 stops (Refer to Blocks (3) and (4)). In this state, when the X-axis drive means 54 is moved to the right in FIG. 1 (Block 5), the measured values $Z_i$ corresponding to the respective positions ($X_i$) in the direction of X-axis which are searched in the measuring means 70 are inputted into the tilt angle calculating means 21 in response to an output signal (displacement signal) from the displacement detector 15. Here, in the tilt angle calculating means 21, the tilt angle $\theta_i$ of the center locus (mean value) of the measured value is searched in accordance with the expressions (1)–(3) and stored temporarily (Block (6)). Subsequently, when, with the measuring length, the relative movement is completed, the X-axis drive means 64 is stopped, and the Z-axis drive means 60 is driven to return the slider 3 to the initial position (Blocks (7)–(10)). The stylus 12 should naturally be in non-contact with the object W.

In this state, as shown in Block (11), the tilt angle $\theta_i$ from the tilt angle calculating means 21 and the tolerable tilt angle $\theta_s$ searched by the tolerable tilt angle operational circuit 33 as the one corresponding to the measuring length set in the measuring length setting section 32 are inputted into the comparator 41, and, in comparison, determination is made as to whether $\theta_i$ is larger than $\theta_s$ or not. When $\theta_i \geq \theta_s$, the position change means 51 is drivably controlled to correct it. A signal calculated by the rotation value operational circuit 43 is inputted into the postion change means 51 through the control circuit 90.

Figure 5B:
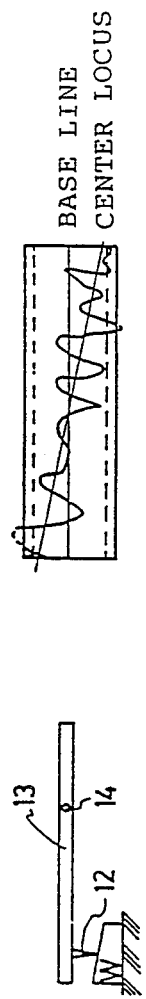
Figure 5C:
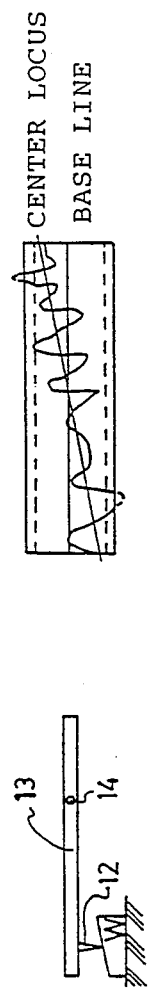

Now, in the position, change means 51, in the case shown in FIG. 5(B), the cam member 59 is moved by a predetermined value to the right in FIG. 1, while, in the case shown in FIG. 5(C), the cam member 59 is moved by a predetermined value to the left in FIG. 1 (Block 12). Accordingly, the mount 52 is rotated about the pivot 53 to the left or right, so that the measuring surface of the object W is changed in position to be generally horizontally. With this arrangement, when the succeeding measurement is performed, the center locus of the measured value can be made to generally coincide with the base line. After this position change, the X-axis drive means 64 is returned to the initial position (Blocks (13)–(15)). In short, the stylus 12 is returned to the initial position.

Accordingly, when the measuring mode is selected by the selection switch, not shown, after the levelling work is automatically performed, roughness measuring can be performed by the displacement detecting means 11, the measuring means 70 and the like with the measured value not scaling out of the upper or lower limit value, and the measured value can be displayed on the display means 80.

According to this embodiment, such an arrangement is adopted that the levelling device can automatically change the positions of the displacement detecting means 11 and the object W in response to an output signal (displacement signal) from the displacement detecting means 11 and the tilt angle $\theta_i$ of the center locus of the measured value can be turned into zero or the minimum by one provisional measuring (levelling), so that much labor and time which have been spent on the conventional levelling work can be relieved to a considerable extent and the test-inspection efficiency and the production efficiency can make rapid progress.

The tilt angle calculating means 21 of the levelling device is adapted to search the center locus and the tilt angle $\theta_i$ of the center locus in response to an output signal (displacement signal) from the displacement detecting means 11, i.e. by the utilization of the measured value from the measuring means 70, so that the construction of the roughness measuring machine, not being greatly changed, can be simplified and economical.

The tolerable tilt angle setter 31 does not merely set a fixed value, but sets a value, while calculating the tolerable tilt angle $\theta_s$ which corresponds to the measuring length set by the measuring length setting section 32, so that the scale-over of the measured value can be obviated, and moreover, the scope formed between the upper and lower limit values can be effectively utilized, thus offering such an advantage that the enlarging rate of the roughness of the object W on the display means can be further improved.

Further, the position change means 51 is constituted by the mount 52, the roller 57, the cam member 59 and the like, so that the construction is simplified and economical, and moreover, this levelling device can be easily mounted onto the conventional roughness measuring machine for working.

Moreover, the tilt angle calculating means 21, the tolerable tilt angle setter 31, the comparator 41, the position change means 51 and the like are adapted to be automatically operated by the control circuit 90 and the like with preset timings, so that levelling work can be automatically operated by the control circuit 90 and the like with preset timings, so that levelling work can be carried out only by selecting the mode. Accordingly, necessity of the conventional groping work is eliminated and handling skill is not required. Futher, the work of mounting the object W onto the mount 52 for the levelling work itself is simplified and labor and time are not wasted as in the past.

In the above embodiment, the levelling device has been provided as the one for changing the position of the object W, however, even if the position change means 51 is made to be able to change the position of the displacement detecting means 11, the present invention can be established only if the positional relationship between the displacement detecting means 11 and the object W can be corrected to adjust for preventing the tilt angle $\theta_i$ of the center locus of the measured value from scaling out.

The tilt angle calculating means 21 has been provided for searching the center locus and the tilt angle $\theta_i$ thereof by the method of least squares in accordance with the expressions (1)–(3), however, the method is out of the question. Similarly, the tolerable tilt angle setter 31 may not be formed integrally with the measuring length setter 32.

Further, the measured value has been displayed on the display means 80, however, the measured value may be stored in the blank for example. It is not limited to the scope of the aforesaid disclosure to change the construction of the roughness measuring machine itself, e.g. the displacement detector 15 into the magnetic induction type one and the like, not using the differential transformer as described above.

As has been described hereinabove, the present invention can offer an outstanding advantage of that the quick and accurate levelling work can be automatically achieved by one provisional measuring.

What is claimed is:

1. A levelling device of a roughness measuring machine, comprising:

tilt angle calculating means for searching the center locus of a measured value in response to a displacement signal from a displacement detecting means of said roughness measuring machine and for searching a tilt angle of the center locus to the base line;

a tolerable tilt angle setter for setting a tolerable tilt angle of the center locus of the measured value to the base line;

a comparator for comparing an output signal from said tilt angle calculating means with an output signal from said tolerable tilt angle setter to determine whether the tilt angle of the center locus of the measured value is larger than the tolerable tilt angle or not; and position change means for receiving an output from said comparator as an output to change the position of an object to be measured or said displacement detecting means such that a tilt angle of the measured value in the succeeding measuring becomes smaller than said tolerable angle, said position change means including a mounting means having the object rested thereon and a tilting means for tilting said mounting means;

whereby automatic levelling work can be performed such that that measured value does not scale out of the upper and lower limit values.

2. A levelling device of a roughness measuring machine as set forth in claim 1, wherein said tilt angle calculating means is provided for searching the center locus of the measured value and the tilt angle thereof by the method of least squares.

3. A levelling device of a roughness measuring machine as set forth in claim 1, wherein said tilting means includes means defining a pivot supporting said mounting means for pivotal movement relative to a base, a roller rotatably mounted onto said mounting means, and a cam member having a tilted surface in contact with said roller and being supported for reciprocating movement.

4. The levelling device of a roughness measuring machine as set forth in claim 3, wherein said cam member is reciprocally driven by a motor, said motor being controlled in rotation value in accordance with the result of comparison by said comparator.

5. A levelling device of a roughness measuring machine, comprising:

tilt angle calculating means for searching the center locus of a measuring value in response to a displacement signal from a displacement detecting means of said roughness measuring machine and for searching a tilt angle of the center locus to the base line;

a tolerable tilt angle setter for setting a tolerable tilt angle of the center locus of the measured value to the base line, said tolerable tilt angle setter including a measuring length setting section and a tolerable tilt angle operational circuit for searching a tolerable tilt angle corresponding to a measuring length set by said length setting section;

a comparator for comparing an output signal from said tilt angle calculating means with an output signal from said tolerable tilt angle setter to determine whether the tilt angle of the center locus of the measured value is larger than the tolerable tilt angle or not; and position change means for receiving an output from said comparator as an output to change the position of an object to be measured or said displacement detecting means such that a tilt angle of the measured value in the succeeding measuring becomes smaller than said tolerable angle;

whereby automatic levelling work can be performed such that the measured value does not scale out of the upper and lower limit values.

* * * * *

UNITED STATES PATENT AND TRADEMARK OFFICE
CERTIFICATE OF CORRECTION

PATENT NO. : 4 888 984

DATED : December 26, 1989

INVENTOR(S) : Chihiro MARUMO et al.

It is certified that error appears in the above-identified patent and that said Letters Patent is hereby corrected as shown below:

Column 8, line 17; change "that that" to ---that the---.

line 40; change "measuring" to ---measured---.

Signed and Sealed this

Fifth Day of March, 1991

Attest:

HARRY F. MANBECK, JR.

Attesting Officer

Commissioner of Patents and Trademarks